United States Patent
Giannetta et al.

(10) Patent No.: US 9,194,702 B2
(45) Date of Patent: Nov. 24, 2015

(54) METHODS AND APPARATUS FOR ADJUSTING HEADING DIRECTION IN A NAVIGATION SYSTEM

(75) Inventors: Michael J. Giannetta, Centerport, NY (US); Chi Zhang, Great Neck, NY (US); Eyal Peretz, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 193 days.

(21) Appl. No.: 13/538,206

(22) Filed: Jun. 29, 2012

(65) Prior Publication Data

US 2014/0005928 A1    Jan. 2, 2014

(51) Int. Cl.
*G01C 21/08* (2006.01)
*G01C 17/28* (2006.01)
*G01S 19/52* (2010.01)

(52) U.S. Cl.
CPC .............. *G01C 17/28* (2013.01); *G01C 21/08* (2013.01); *G01S 19/52* (2013.01)

(58) Field of Classification Search
CPC ...... G01C 21/165; G01C 17/28; G01C 21/08; G01S 19/49; G01S 19/53
USPC .................................. 701/400–499
See application file for complete search history.

(56) References Cited

U.S. PATENT DOCUMENTS

| | | | |
|---|---|---|---|
| 4,914,605 A | | 4/1990 | Loughmiller, Jr. et al. |
| 6,029,111 A * | | 2/2000 | Croyle .......................... 701/494 |
| 6,138,073 A * | | 10/2000 | Uchigaki ....................... 701/410 |
| 6,366,856 B1 * | | 4/2002 | Johnson ......................... 701/454 |
| 6,381,540 B1 | | 4/2002 | Beason et al. |
| 6,956,525 B1 | | 10/2005 | Chang |
| 7,543,392 B2 | | 6/2009 | Kwon et al. |
| 8,065,074 B1 | | 11/2011 | Liccardo |
| 8,374,785 B2 * | | 2/2013 | McBurney et al. ........... 701/472 |
| 8,898,034 B2 * | | 11/2014 | Huang et al. .................. 702/150 |
| 2003/0109987 A1 * | | 6/2003 | Barman et al. ................ 701/213 |
| 2010/0259458 A1 | | 10/2010 | Mattis et al. |

(Continued)

FOREIGN PATENT DOCUMENTS

| | | |
|---|---|---|
| EP | 1318381 A2 | 6/2003 |
| EP | 1336078 B1 | 5/2011 |

OTHER PUBLICATIONS

International Search Report and Written Opinion for International Patent Application No. PCT/US2013/044947 mailed Sep. 19, 2013.

(Continued)

*Primary Examiner* — Nga X Nguyen

(57) ABSTRACT

A mobile device is described. The mobile device includes an electronic compass that generates compass data corresponding to an orientation of the mobile device relative to true north. A global positioning system (GPS) module receives a GPS signal from multiple satellites. The GPS module determines a heading direction of a vehicle transporting the mobile device relative to true north based on the position data when the vehicle is moving above a threshold velocity. A motion sensor generates motion data corresponding to a motion of the mobile device when the mobile device is moved. A processor adjusts the heading direction of the vehicle relative to true north based on the compass data when the vehicle is moving below the threshold velocity.

18 Claims, 4 Drawing Sheets

(56) References Cited

U.S. PATENT DOCUMENTS

2010/0283696 A1    11/2010   Park
2011/0096165 A1     4/2011   Zeng et al.
2012/0173195 A1*    7/2012   Opshaug et al. .............. 702/151

OTHER PUBLICATIONS

"Kinematic Azimuth Alignment of Using GPS Velocity Information" by A.O. Salycheva and M.E. Cannon, Proceedings of NTM 2004 Conference (Session E3), Jan. 26-28, 2004, The Institute of Navigation.

* cited by examiner

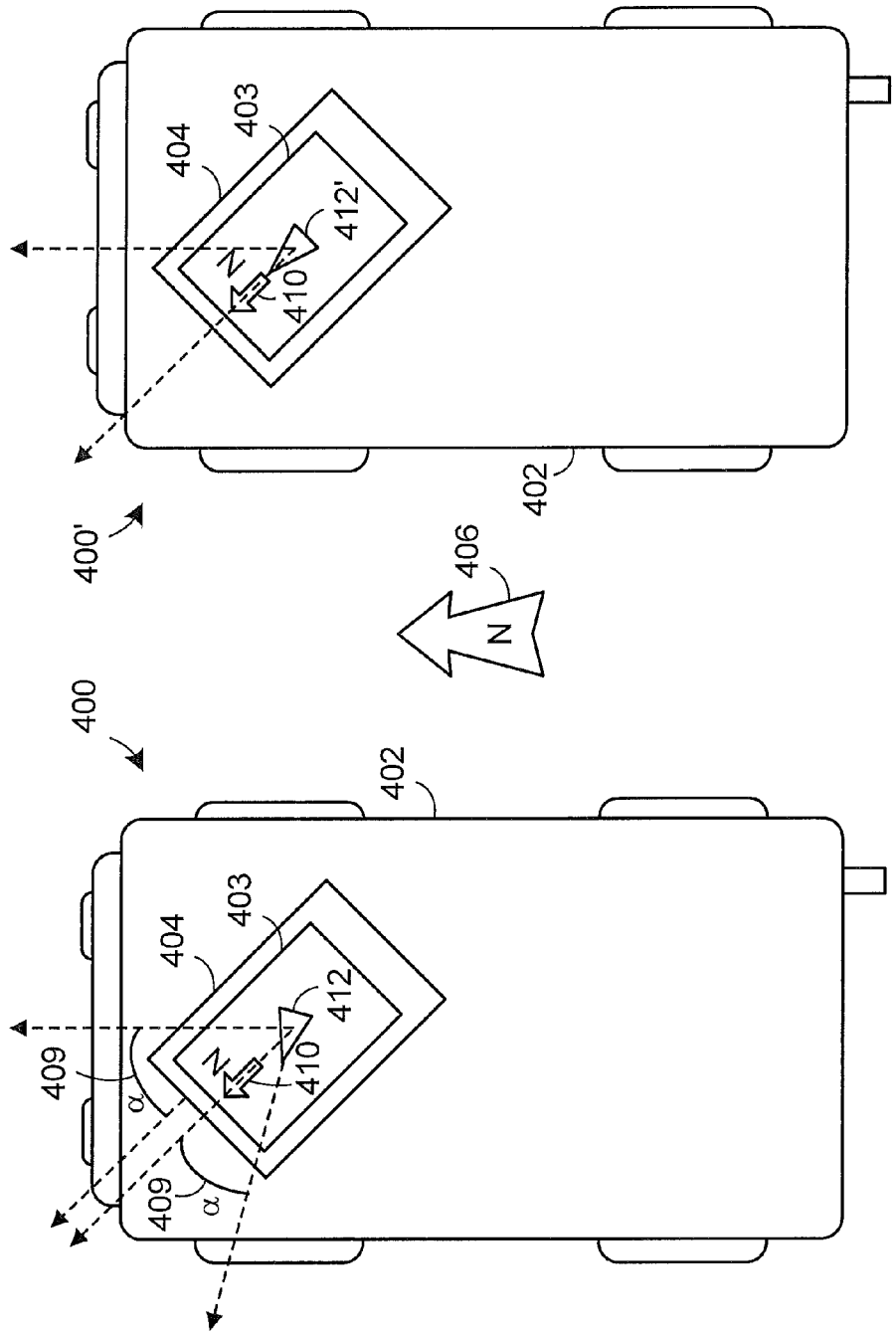

METHODS AND APPARATUS FOR ADJUSTING HEADING DIRECTION IN A NAVIGATION SYSTEM

TECHNICAL FIELD

This invention relates generally to a global positioning system (GPS) in a mobile terminal, and more particularly, to adjusting the heading direction of a vehicle on a mobile terminal equipped with GPS functionality.

BACKGROUND

Typical GPS systems are designed to receive position information from a plurality of satellites that periodically broadcast GPS signals to a GPS receiver. The GPS system can calculate the heading direction of a vehicle relative to magnetic north when the vehicle is in motion. However, the heading direction cannot be calculated when the vehicle is stationary or moving below a threshold velocity.

SUMMARY

In one aspect, the invention is embodied in a mobile device. The mobile device includes an electronic compass that generates compass data corresponding to an orientation of the mobile device relative to true north. A global positioning system (GPS) module receives a GPS signal from multiple satellites. The GPS module determines a heading direction of a vehicle transporting the mobile device relative to true north based on the position data when the vehicle is moving above a threshold velocity. A motion sensor generates motion data corresponding to a motion of the mobile device when the mobile device is moved relative to the vehicle. A processor adjusts the heading direction of the vehicle relative to true north based on the compass data when the vehicle is moving below the threshold velocity.

In one embodiment, the mobile device also includes a display for displaying a route of the mobile device and a pointer overlaid on the route. The direction of the pointer indicates the heading direction of the vehicle relative to true north. The processor periodically adjusts the direction of the pointer in response to the compass data.

The processor can be integrated with the GPS module. The GPS module outputs National Marine Electronics Association (NMEA) data. In one embodiment, the GPS module determines the velocity data by dividing a change in a position of the mobile device by a change in time.

The motion sensor can detect a change in orientation of the mobile device mobile device relative to the vehicle. The motion sensor can include an accelerometer or a gyroscope.

In another aspect, the invention is embodied in method of compensating for orientation of a mobile device. Compass data is generated corresponding to an orientation of the mobile device relative to true north. A GPS signal is received from a plurality of satellites. A heading direction of a vehicle transporting the mobile device relative to true north is determined based on the GPS signal when the mobile device is moving above a threshold velocity. The heading direction of the vehicle is adjusted based on the compass data when the vehicle is moving below the threshold velocity In one embodiment, the method further includes displaying a route of the mobile device and a pointer overlaid on the route. The direction of the pointer indicates the heading direction of the vehicle relative to true north. The method can also include periodically adjusting the direction of the pointer in response to the compass data. The method can also include outputting National Marine Electronics Association (NMEA) data.

In another aspect, the invention is embodied in a mobile device. The mobile device includes a display for displaying a route of the mobile device. The route includes a pointer overlaid on the route. A direction of the pointer indicates the heading direction of a vehicle transporting the mobile device. A position of the pointer indicates a position of the vehicle on the route. An electronic compass generates compass data corresponding to an orientation of the mobile device relative to true north. The compass data is displayed on the display. A global positioning system (GPS) module receives a GPS signal from a plurality of satellites. The GPS module determines the heading direction of the vehicle relative to true north based on the GPS signal when the vehicle is moving above a threshold velocity. A processor adjusts the heading direction of the vehicle relative to true north based on the compass data when the vehicle is moving below the threshold velocity.

In one embodiment, the processor periodically adjusts the direction of the pointer in response to the compass data. The processor can be integrated with the GPS module. The GPS module outputs National Marine Electronics Association (NMEA) data.

The motion sensor can include an accelerometer or a gyroscope.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

FIG. 4A and FIG. 4B are schematic diagrams illustrating heading information on a display of a mobile device according to the invention.

DETAILED DESCRIPTION

Figure 1:
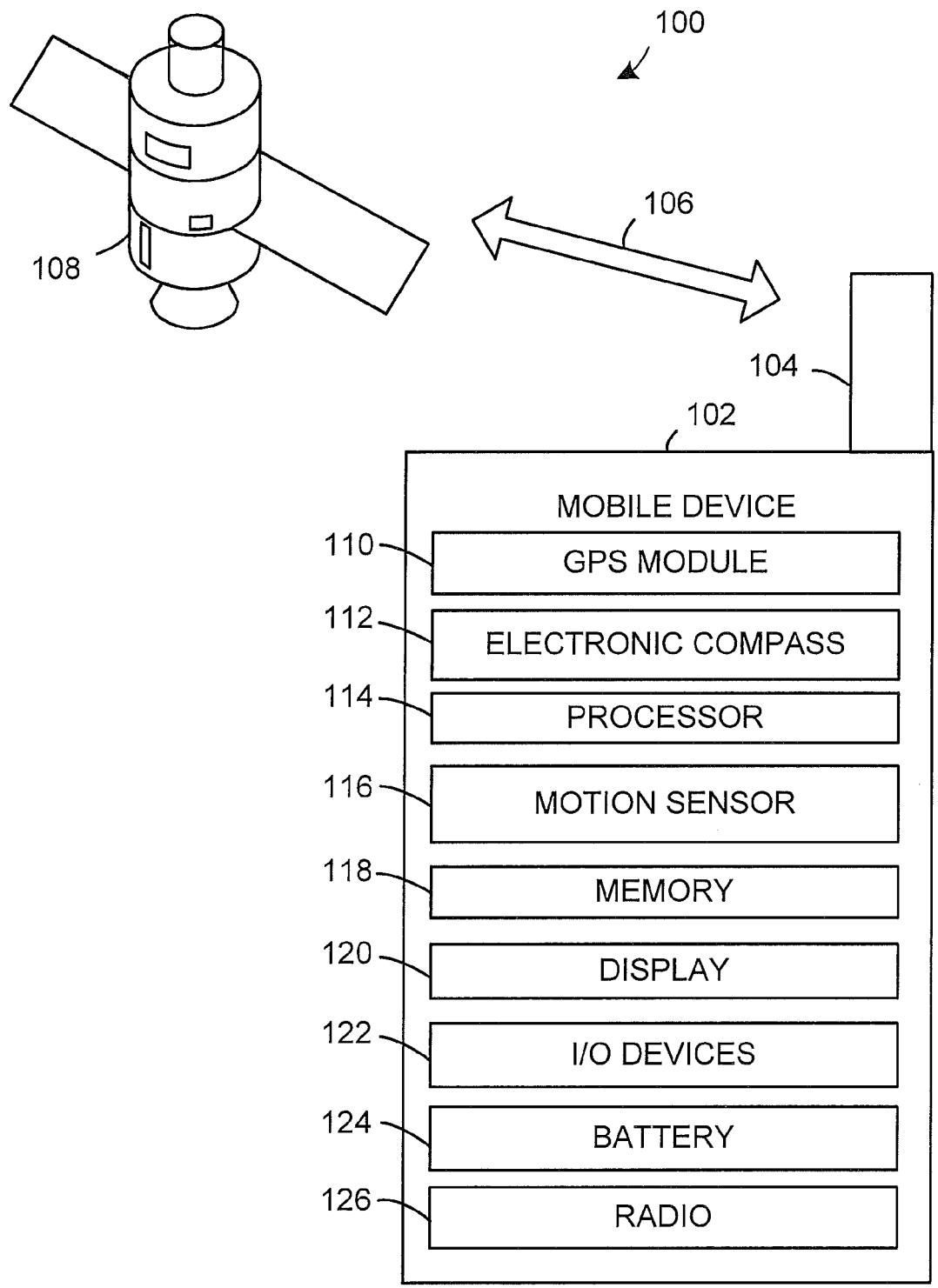
FIG. 1 illustrates a block diagram of one embodiment of a system according to the invention.

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional global positioning systems, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to a mobile device including a global positioning system (GPS) module. The mobile device can also include a display for displaying a route of the mobile device. The route includes a pointer that is overlaid on the route. A direction of the pointer indicates the heading direction of a vehicle transporting the mobile device and a position of the pointer indicates a position of the vehicle on the route. An electronic compass generates compass data corresponding to an orientation of the mobile device relative to true north. In one embodiment, the compass data can be displayed on the display.

A global positioning system (GPS) module receives position data from a plurality of satellites. The GPS module determines the heading direction of the vehicle relative to true north based on the position data when the vehicle is moving at a velocity above a minimum threshold velocity. A motion sensor generates motion data corresponding to a motion of the mobile device when the mobile device is moved.

A processor determines the difference between the orientation of the mobile device relative to true north and the heading direction of the vehicle relative to true north as determined by the position data. The processor can adjust the direction of the pointer relative to the orientation of the mobile device.

FIG. 1 illustrates a block diagram of one embodiment of a system 100 according to the invention. The system 100 includes a mobile device 102. The mobile device 102 includes a GPS antenna 104 that receives GPS radio signals 106 from one or more satellites 108. The antenna 104 is coupled to a GPS module 110 within the mobile device 102. The GPS module 110 processes signals 106 from the satellite 108 and determines position information of a vehicle transporting the mobile device 102 in response to the signals 106. The GPS module 110 includes a GPS processor (not shown) that outputs National Marine Electronics Association (NMEA) data.

In one embodiment, the GPS module 110 includes a GPS receiver and a dedicated processor. The GPS receiver is coupled to the GPS antenna 104 and periodically receives the GPS signals 106 transmitted by one or more GPS satellites 108. The GPS module 110 can determine a heading direction and the velocity of the vehicle when the vehicle is traveling above a minimum threshold velocity. The GPS module 110 derives the velocity and heading direction by determining an elapsed time between a first position and a second position of the vehicle and dividing the distance between the positions by the elapsed time.

The GPS module 110 can also infer the heading direction of the vehicle based on a vector drawn between the first position and the second position. The GPS module 110 cannot accurately determine true north and heading direction when the vehicle is stationary or moving below the threshold velocity.

Additionally, a processor 114 of the mobile device 102 can determine an azimuth angle of the vehicle transporting the mobile device 102 based on the NMEA output of the GPS module 110 when the vehicle is traveling above the threshold velocity. By azimuth angle, we mean the angle between the true north direction and a heading direction of the vehicle transporting the mobile device 102.

In one embodiment of the invention, when the vehicle transporting the mobile device 102 is traveling below the threshold velocity, the GPS module 110 is incapable of providing accurate true north and heading direction information. The electronic compass 112 can provide a compass signal to the processor 114 corresponding to the true north direction and the orientation of the mobile device relative to the true north direction. The processor 114 can incorporate the compass signal into the NMEA data generated by the GPS module 110 to adjust the heading direction determined by the processor 114.

The electronic compass 112 can include a magnetic sensor (not shown). The magnetic sensor can detect the earth's magnetic field and generate compass data. The compass data corresponds to a true north direction. In one embodiment, the electronic compass 112 can contain a dedicated processor (not shown) that generates the true north data. In one embodiment, the electronic compass 112 can transmit the compass data and or/the true north data to the processor 114. In one embodiment, the electronic compass 112 can determine an orientation of the mobile device 102 relative to the true north direction. The orientation data can be transmitted to the processor 114. In one embodiment, the processor 114 can determine the orientation of the mobile device 102 based on the compass data.

For example, with knowledge of its own orientation/position within the mobile device 102, the electronic compass 112 can determine the angular orientation of the mobile device 102 relative to the true north direction.

The mobile device 102 can also include a motion sensor 116. The motion sensor 116 can include any suitable device or devices capable of determining changes in motion or orientation, such as an accelerometer, gyroscope, magnetometer, or mercury switch, for example. In one embodiment, the motion sensor 116 can determine orientation and/or motion of the mobile device 102 in different dimensions. The motion sensor 116 can generate motion data that is transmitted to the processor 114 when the mobile device 102 is moved.

The mobile device 102 can also include a memory 118 coupled to the processor 114. The memory 118 can store data and software applications for execution on the processor 114. For example, the memory 118 can store geographical maps for use with the GPS module 110. The memory 118 can also store an operating system executing on the processor 114 of the mobile device 102. Each of the operating system and the applications can include a graphical user interface (GUI).

A display 120 can display information, such as geographical maps generated by a software application and/or the graphical user interface (GUI) generated by the operating system executing on the processor 114. The display 120 can be any suitable display, such as a liquid crystal display (LCD). The display 120 can also include touch screen capability. For example, a user of the mobile device 102 can activate functions of the mobile device 102 by selecting icons viewable on the touch screen display 120.

The mobile device 102 can also include additional input/output (I/O) devices 122, such as a keypad, a joystick, a microphone, a speaker, a track pad, switches or a thumb-wheel, for example. The I/O devices 122 can allow a user to interface with the mobile device 102.

The mobile device 102 can also include other components, such as a battery 124 for powering the mobile device 102. In one embodiment, the mobile device 102 can include a cellular radio and/or a wireless local area network (WLAN) radio 126 for wirelessly communicating with a wireless network.

In operation, the motion sensor 116 can generate motion data that the processor 114 uses to determine whether the mobile device 102 was re-oriented by a user. For example, based on the motion data, the processor 114 can determine if a user picks-up the mobile device 102 to view the display 120.

In one mode of operation, when the vehicle transporting the mobile device 102 is traveling above the threshold velocity, the GPS module 110 generates the vehicle heading direction. In this mode, compass data from the electronic compass 112 is not integrated with the NMEA output from the GPS module 110 to adjust a direction of a displayed pointer indicating the heading direction of a vehicle transporting the mobile device 102.

When the vehicle transporting the mobile device 102 travels below the threshold velocity or is stationary, the mobile device 102 can operate in one of two modes. The first mode is the device orientation mode (DOM). In the device orientation mode, compass data from the electronic compass 112 is integrated with the NMEA data generated by the GPS module 110 to determine heading direction of the mobile device 102 relative to true north regardless of the orientation of the mobile device 102 relative to the vehicle. In the device orientation mode, the heading direction information generated by the GPS module 110 is unreliable and substantially replaced by the compass data from the electronic compass 112 in the NMEA data.

The second mode is the vehicle pointing mode (VPM). In the vehicle pointing mode, the vehicle transporting the mobile device 102 is traveling below the threshold velocity. The processor 114 adjust the previously-generated heading direction information output from the GPS module 110 when the vehicle transporting the mobile device 102 was traveling above the threshold velocity with newly detected orientation change from the electronic compass 112 data to determine the heading direction of the vehicle now traveling below the threshold velocity.

In the vehicle pointing mode, compass data from the electronic compass 112 is periodically or continuously integrated with the NMEA data from the GPS module 110 to adjust the heading direction of the vehicle when the vehicle is traveling below the threshold velocity. This assumes that the mobile device 102 is stationary relative the vehicle transporting the mobile device 102.

In the vehicle pointing mode, when the mobile device 102 is moved relative to the vehicle (as detected by the motion sensor 116), such as by a user operating the mobile device 102, the mobile device 102 can optionally exit the vehicle pointing mode automatically and enter the device orientation mode or remain in the vehicle pointing mode.

In one embodiment, the user can select whether or not to remain in the vehicle pointing mode (VPM) of operation in which compass data from the electronic compass 112 is utilized to adjust a direction of a displayed pointer indicating the heading direction of a vehicle transporting the mobile device 102 when the user re-orients or moves the mobile device 102 relative to the vehicle.

The display 120 of the mobile device can display a route of the mobile device 102. A direction of a pointer overlaid on the route can indicate the heading direction of the vehicle relative to true north. When the vehicle transporting the mobile device 102 is traveling below the threshold velocity, the processor 114 can adjust the direction of the pointer by integrating the current compass data with the last known heading direction (as determined by the GPS module 110 traveling above the threshold velocity) of the vehicle transporting the mobile device 102.

The mobile device 102 can be a mobile computer, a personal digital assistant (PDA), a cellular telephone or a satellite telephone, for example. The mobile device 102 includes electronic components, including internal communication components and circuitry as further described with relation to FIG. 2 to enable the mobile device 102 to function and to communicate wirelessly with other devices.

Figure 2:
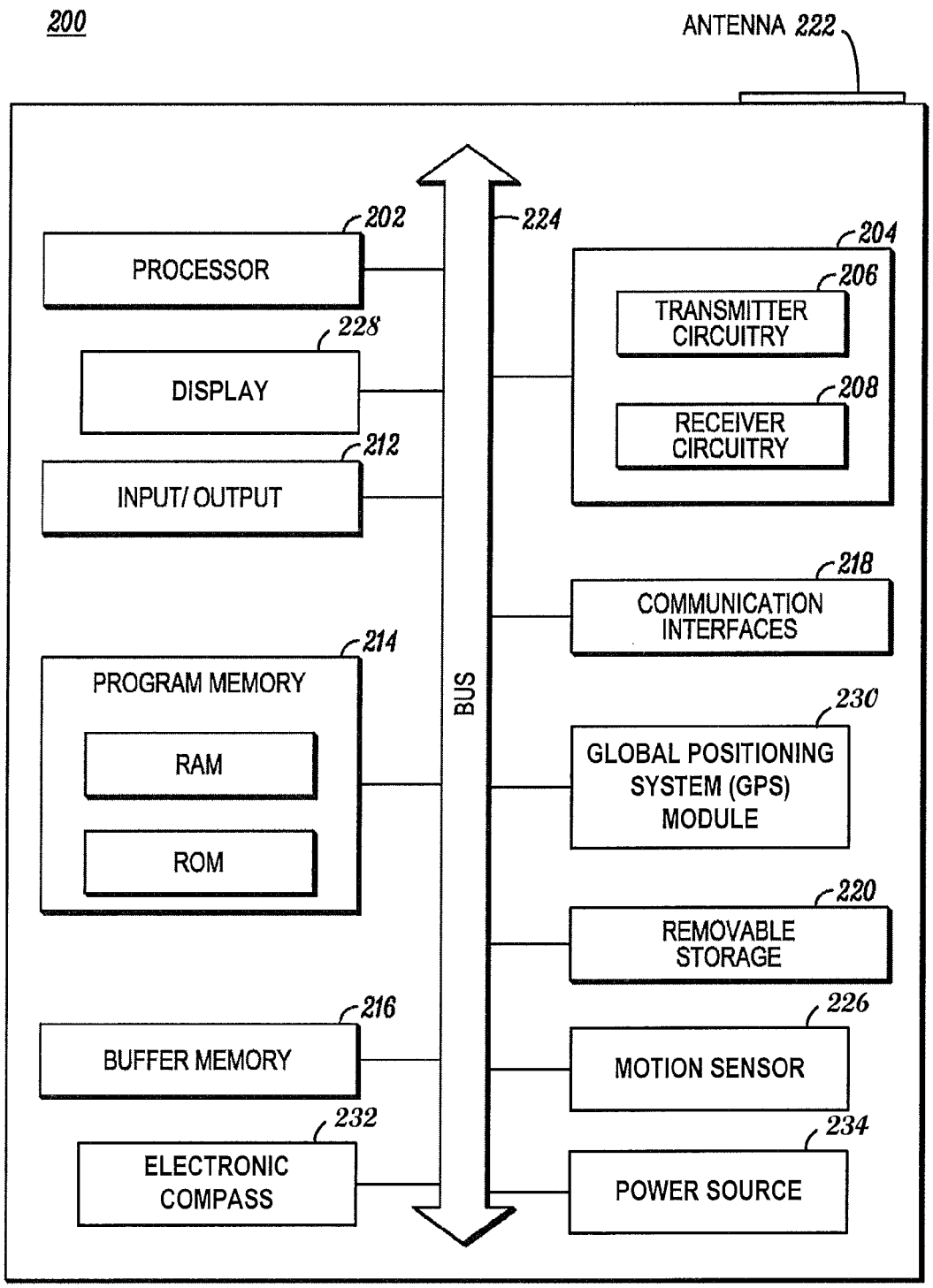
FIG. 2 is a block diagram illustrating the electronic components of a mobile device according to the invention

FIG. 2 is a block diagram 200 illustrating the electronic components of the mobile device 102 (FIG. 1) according to the invention. The mobile device 102 contains, among other components, a processor 202, a transceiver 204 including transmitter circuitry 206 and receiver circuitry 208, an antenna 222, I/O devices 212, a program memory 214 for storing operating instructions that are executed by the processor 202, a buffer memory 216, one or more communication interfaces 218, a display 228, an optional removable storage 220, a motion sensor 226, a global positioning system (GPS) module 230, an electronic compass 232, and a power source 234.

The motion sensor 226 is rigidly coupled to the mobile device 102 (FIG. 1) for detecting a movement, such as an orientation, of the mobile device 102, for example. The motion sensor 226 can include one or more motion tracking components, such as an accelerometer, a gyroscope, a magnetometer, and/or one or more mercury switches, for example. Other suitable components can also be used. In some embodiments, the motion sensor 226 can be used to detect a motion and/or an orientation of the mobile device 102.

In one embodiment, the motion sensor 226 includes an accelerometer having three outputs each corresponding to one dimension in space. As the mobile device 102 is moved forward, backward, sidewise, tilted up/down or tilted left/right a software application executing on the processor 202 in the mobile device 102 receives motion data from the motion sensor 226.

In one embodiment, the mobile computing device 102 is an integrated unit containing the components depicted in FIG. 2, as well as any other component necessary for the mobile computing device 102 to function. In one embodiment, the electronic components are connected by a bus 224.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry.

The transmitter circuitry 206 and the receiver circuitry 208 enable the mobile device 102 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the mobile device 102 and the devices with which it is to communicate. For example, the transmitter and receiver circuitry 206, 208 can be implemented as part of the communication device hardware and software architecture in accordance with known techniques. One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. The antenna 222 can be a WAN or a LAN antenna or a cellular network antenna coupled to the transceiver 204. The antenna 222 can alternatively be a GPS antenna that is coupled to the GPS module 230. Multiple antennas can also be used.

The buffer memory 216 may be any form of volatile memory, such as RAM, and is used for temporarily storing information received from the processor 202 and/or the motion sensor 226, for example. The removable storage 220 can be a secure digital (SD) memory card, for example.

The display 228 displays data generated by software applications residing in the memory 214 and executing on the processor 202. The display 228 can be a liquid crystal display (LCD) or any other suitable display. In one embodiment, the display 228 is a touch screen display having user input capabilities. For example, the user can touch the surface of the display 228 to activate a function of the mobile device 102.

A software application executing on the processor 202 of the mobile device 102 can generate a geographical map having a pointer that is overlaid on the map. The pointer indicates the heading direction of a vehicle transporting the mobile device 102 on the map. The electronic compass 232 of the vehicle generates compass data corresponding to the orientation of the mobile device relative to true north. In one embodiment, the processor 202 adjusts the pointer on the display 228 in response to the compass data to correspond to the heading direction of the vehicle.

Figure 3:
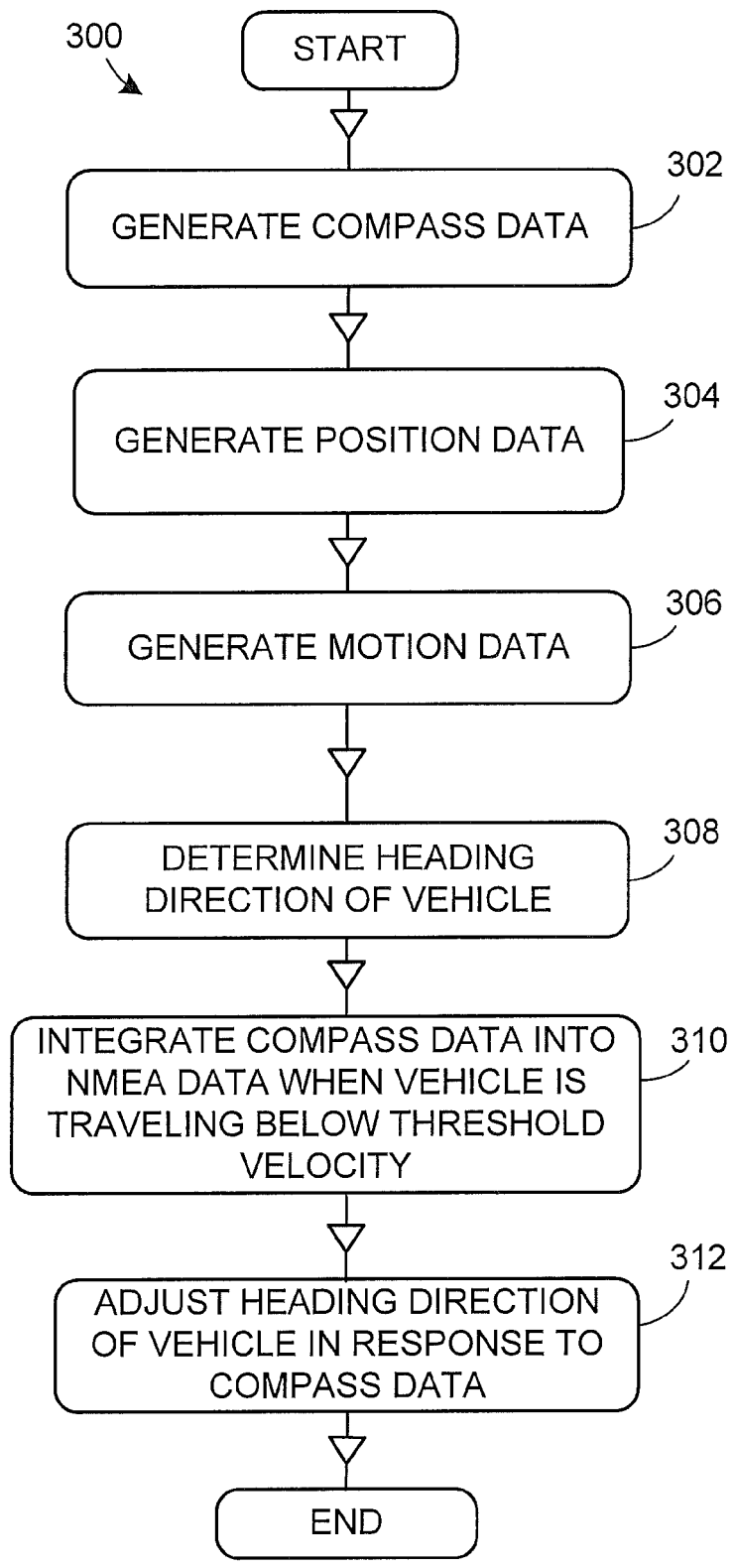
FIG. 3 is a flowchart illustrating one mode of operation of a system in accordance with the invention.

FIG. 3 is a flowchart 300 illustrating one mode of operation of a system in accordance with the invention. In a first step 302, the electronic compass 112 (FIG. 1) generates compass data corresponding to an orientation of a mobile device 102 relative to true north. The GPS module 110 generates position data of the mobile device 102 based on signals received from a plurality of satellites 108 (step 304). In one embodiment, the GPS module 110 of the mobile device 102 outputs National Marine Electronics Association (NMEA) data. In one embodiment, a route of a vehicle transporting the mobile device 102 is displayed on a display 120 of the mobile device 102. A pointer can be displayed on the displayed route.

A motion sensor 116 generates motion data corresponding to a motion of the mobile device 102 when the mobile device 102 is moved (step 306).

The GPS module 110 determines a heading direction of a vehicle transporting the mobile device 102 relative to true north based on the GPS signals 106 from the satellites 108 when the mobile device 102 is moving at a speed above the minimum threshold (step 308). The pointer indicates the heading direction of the vehicle on the display 120.

In the vehicle pointing mode, the vehicle transporting the mobile device 102 is traveling below the threshold velocity. The processor 114 integrates previously-generated heading direction information output from the GPS module 110 when the vehicle transporting the mobile device 102 was traveling above the threshold velocity with currently-generated compass data from the electronic compass 112 to adjust the previously-known heading direction of the vehicle by the change of the orientation of the mobile device based on the continuous or periodical input of compass data (step 310).

The direction of the pointer on the display 120 indicates the compensated heading direction of the vehicle transporting the mobile device 102 relative to true north. In one embodiment, the direction of the pointer can be periodically or continuously adjusted when the NMEA data is updated with the compass data. The processor 114 adjusts the direction of the pointer based on the compass data integrated into the NMEA data (step 312).

FIG. 4A and FIG. 4B are schematic diagrams 400 400' illustrating heading information of a vehicle 402 displayed on a display 403 of a mobile device 404 according to the invention. FIG. 4A illustrates the device orientation mode (DOM). In the device orientation mode, the vehicle 402 is traveling below the threshold velocity and the compass data the electronic compass 112 is integrated with the NMEA data generated by the GPS module 110 to determine heading direction of the mobile device 404 regardless of the orientation of the mobile device 102 relative to the vehicle 402. The electronic compass 112 (FIG. 1) generates compass data that indicates the orientation (angle 409) of the mobile device 404 relative to true north.

The display 403 of the mobile device 404 includes an optional indicator 410 that illustrates the true north direction 406. A pointer 412 illustrates the heading direction of the mobile device 404. It should be noted that the mobile device 404 transported by the vehicle 402 is positioned such that it is not oriented parallel to the heading direction (north) 406 of the vehicle 402. When the vehicle 402 slows to below a threshold velocity or stops, the GPS module 110 generates unreliable heading direction information in the NMEA data. The compass data from the electronic compass replaces the unreliable heading data in the NMEA output that is provided by the processor 114.

The motion detector 116 generates motion data. The motion data can indicate to the processor 114 that the vehicle 402 has decelerated or accelerated.

When the vehicle was traveling above the threshold velocity, the GPS module 110 provided information to the processor 114 related to the heading direction of the vehicle 402 transporting the mobile device 404. If the vehicle now travels below the threshold velocity, the compass data generated by the electronic compass 112 is integrated with the previously-known heading information in the NMEA data to determine the heading direction of the vehicle. The processor 114 adjusts the pointing direction of the pointer 412 displayed on the display 403 of the mobile device 404 to illustrate the vehicle pointing mode (VPM). Thus, a pointer 412' illustrated on the display 403 in FIG. 4B is adjusted and now corresponds to the heading direction 406 of the vehicle 402.

As previously described, the motion detector 116 can detect whether the mobile device 404 has been moved by the user relative to the vehicle 402. In response to the detection, the processor 114 can trigger a prompt on a user interface to allow a user to decide whether or not to continue to implement the vehicle pointing mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for remotely controlling the networked camera described herein. The non-processor circuits may include, but are not limited to, a radio receiver, a radio transmitter, signal drivers, clock circuits, power source circuits, and user input devices. As such, these functions may be interpreted as steps of a method to remotely control the networked camera described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts or steps is intended to be required unless specifically indicated.

What is claimed is:

1. A mobile device comprising:
an electronic compass including a magnetic sensor, the electronic compass generating compass data corresponding to an orientation of the mobile device relative to true north;
a global positioning system (GPS) module receiving a GPS signal from a plurality of satellites, the GPS module determining a heading direction of a vehicle transporting the mobile device relative to true north based on the GPS signal when the vehicle is moving above a threshold velocity;
a motion sensor generating motion data corresponding to a motion of the mobile device when the mobile device is moving relative to the vehicle; and
a processor operating the mobile device in at least one of a vehicle pointing mode (VPM) and a device orientation mode (DOM) in response to a velocity of the vehicle decreasing below the threshold velocity,
wherein the processor operates the mobile device in the vehicle pointing mode (VPM) when the mobile device is stationary relative to the vehicle, by adjusting the heading direction determined by the GPS module when the vehicle was moving above the threshold velocity based on a change in the compass data since the decrease in the velocity of the vehicle; and
wherein the processor operates the mobile device in the device orientation mode (DOM) when the motion sensor detects a change in orientation of the mobile device relative to the vehicle, by replacing the heading direction determined by the GPS module with the compass data.

2. The mobile device of claim 1 further comprising a display for displaying a route of the mobile device and a pointer overlaid on the route, the direction of the pointer indicating the heading direction of the vehicle relative to true north.

3. The mobile device of claim 2 wherein the processor periodically adjusts the direction of the pointer in response to the compass data.

4. The mobile device of claim 1 wherein the processor is integrated with the GPS module.

5. The mobile device of claim 1 wherein the GPS module outputs National Marine Electronics Association (NMEA) data.

6. The mobile device of claim 1 wherein the GPS module determines the velocity of the vehicle by dividing a change in a position of the mobile device by a change in time.

7. The mobile device of claim 1 further comprising a user interface for instructing the processor to cease adjusting the determined heading direction of the vehicle relative to true north based on the compass data when the vehicle is moving below the threshold velocity.

8. The mobile device of claim 1 wherein the motion sensor comprises at least one of an accelerometer and gyroscope.

9. A method of adjusting heading direction in a mobile device comprising:
generating compass data at an electronic compass including a magnetic sensor, the compass data corresponding to an orientation of the mobile device relative to true north;
receiving a global position system (GPS) signal from a plurality of satellites;
determining a heading direction of a vehicle transporting the mobile device relative to true north based on the GPS signal when the vehicle is moving above a threshold velocity;
generating motion data corresponding to a motion of the mobile device when the mobile device is moved relative to the vehicle; and
operating the mobile device in at least one of a vehicle pointing mode (VPM) and a device orientation mode (DOM) in response to a velocity of the vehicle decreasing below the threshold velocity,
when the mobile device is stationary relative to the vehicle, operating the mobile device in the vehicle pointing mode (VPM) by adjusting the heading direction determined by the GPS module when the vehicle was moving above the threshold velocity based on a change in the compass data since the decrease in the velocity of the vehicle, and
when the motion sensor detects a change in orientation of the mobile device relative to the vehicle, operating the mobile device in the device orientation mode (DOM) by replacing the heading direction determined by the GPS module with the compass data.

10. The method of claim 9 further comprising displaying a route of the vehicle on a display of the mobile device and a pointer overlaid on the route, the direction of the pointer indicating the heading direction of the vehicle relative to true north.

11. The method of claim 10 further comprising periodically adjusting the direction of the pointer in response to the compass data.

12. The method of claim 9 further comprising outputting National Marine Electronics Association (NMEA) data.

13. A mobile device comprising:
a display for displaying a route of the mobile device, the route including a pointer overlaid on the route, a direction of the pointer indicating the heading direction of a vehicle transporting the mobile device and a position of the pointer indicating a position of the vehicle on the route;
an electronic compass including a magnetic sensor, the electronic compass generating compass data corresponding to an orientation of the mobile device relative to true north;
a global positioning system (GPS) module receiving a GPS signal from a plurality of satellites, the GPS module determining a heading direction of a vehicle transporting the mobile device relative to true north based on the GPS signal when the vehicle is moving above a threshold velocity;
a motion sensor generating motion data corresponding to a motion of the mobile device when the mobile device is moving relative to the vehicle; and a processor operating the mobile device in at least one of a vehicle pointing mode (VPM) and a device orientation mode (DOM) in response to a velocity of the vehicle is decreasing below the threshold velocity, wherein the processor operates the mobile device in the vehicle pointing mode (VPM) when the mobile device is stationary relative to the vehicle, by adjusting the heading direction determined by the GPS module when the vehicle was moving above the threshold velocity based on a change in the compass data since the decrease in the velocity of the vehicle, and wherein the processor operates the mobile device in the device orientation mode (DOM) when the motion sensor detects a change in orientation of the mobile device relative to the vehicle, by replacing the heading direction determined by the GPS module with the compass data.

14. The mobile device of claim 13 wherein the processor periodically adjusts the direction of the pointer in response to the compass data.

15. The mobile device of claim 13 wherein the processor is integrated with the GPS module.

16. The mobile device of claim 13 wherein the GPS module outputs National Marine Electronics Association (NMEA) data.

17. The mobile device of claim 13 wherein the motion sensor comprises at least one of an accelerometer and a gyroscope.

18. The mobile device of claim 13 further comprising a user interface for instructing the processor to cease adjusting the determined heading direction of the vehicle relative to true north based on the compass data when the vehicle is moving below the threshold velocity.

* * * * *